United States Patent [19]
Terai

[11] Patent Number: 5,531,471
[45] Date of Patent: Jul. 2, 1996

[54] AIR BAG AND LID ARRANGEMENT FOR VEHICLE

[75] Inventor: Takehiro Terai, Atsugi, Japan

[73] Assignee: Nissan Motor Co., Ltd., Yokohama, Japan

[21] Appl. No.: 137,214

[22] Filed: Oct. 18, 1993

Related U.S. Application Data

[63] Continuation of Ser. No. 903,787, Jun. 24, 1992, abandoned.

[30] Foreign Application Priority Data

Jun. 26, 1991 [JP] Japan .................. 3-154535

[51] Int. Cl.$^6$ ................................. B60R 21/16
[52] U.S. Cl. .................. 280/732; 49/147; 49/397; 280/728.1; 280/728.3; 280/730.1; 454/69
[58] Field of Search ............. 280/728 R, 728 B, 280/731, 732, 730 R, 743 R; 454/69, 144; 49/397, 398, 147

[56] References Cited

U.S. PATENT DOCUMENTS

| | | | |
|---|---|---|---|
| 3,550,522 | 12/1970 | Bauer | 454/144 |
| 4,773,673 | 9/1988 | Sakurai | 280/732 |
| 4,925,209 | 5/1990 | Sakurai | 280/728 |
| 5,066,037 | 11/1991 | Castrigno et al. | 280/732 |
| 5,135,253 | 8/1992 | Hirashima et al. | 280/732 |
| 5,191,819 | 11/1992 | Rhodes, Jr. | 280/728 B |

FOREIGN PATENT DOCUMENTS

| | | | |
|---|---|---|---|
| 616746 | 2/1961 | Italy | 49/398 |
| 63-100351 | 6/1988 | Japan . | |
| 2-299951 | 12/1990 | Japan | 280/732 |

Primary Examiner—Eric D. Culbreth
Attorney, Agent, or Firm—Lowe, Price, LeBlanc & Becker

[57] ABSTRACT

A air bag and lid arrangement for a vehicle passenger compartment is mounted in an opening in a vehicle instrument panel with an air bag module being mounted on a bracket associated with a steering member. A top edge of the opening has a facing portion corresponding to a flange formed on a top edge of a lid. When the lid is attached over the opening it is situated such that, when the air bag inflates, pressure is applied by the surface of the air bag to an inner surface of the lid proximate the flange causing the flange to act as a hinge for opening the lid with substantially no time lag between the inflation of the air bag and the opening of the lid. The lid is further positioned such that impact applied to an outer surface of thereof will not damage the air bag module.

7 Claims, 3 Drawing Sheets

AIR BAG AND LID ARRANGEMENT FOR VEHICLE

This application is a continuation of application Ser. No. 07/903,787 filed Jun. 24, 1992 now abandoned.

BACKGROUND OF THE INVENTION

1. Field of the Invention

The present invention relates generally to an arrangement for installing a lid for an air bag in an automotive vehicle. Particularly, the present invention relates to a air bag arrangement in which a lid portion which covers the air bag may open instantly in a vehicle collision condition with substantially no time lag between inflation of the air bag and opening of the lid.

2. Description of the Prior Art

In order to protect passengers at a time of vehicle collision, sudden stopping, etc., air bags, mounted in an instrument panel of a vehicle are well known. For example, Japanese Utility Model First Publication 63-100351 discloses such a conventional air bag mounting arrangement including a lid mounted in the instrument panel for covering the air bag. When a vehicle emergency condition, such as a collision, for example, occurs, the air bag inflates, applying pushing pressure against a trigger mechanism to cause the lid portion to open, thus allowing the air bag to inflate fully.

According to such air bag arrangements, a hinge portion of a lid must open widely in response to pushing force generated by the inflation of the air bag. Further a trigger mechanism must be provided for releasing the lid portion.

However, in such conventional air bag arrangements a substantial amount of empty space is present between an air bag module and a lid. Thus, when the air bag inflates, a substantial time lag is incurred between the beginning of air bag inflation and the opening of the lid. Further, since the air bag does not activate the trigger mechanism until substantial inflation has occurred, an inflation force of pressurized gas for inflating the air bag must be kept substantially high. Also, such conventional trigger and hinge mechanisms are costly and complex.

Thus is has been required to provide an air bag and lid arrangement in which a time lag between inflation of an air bag and opening of a lid is minimized and which is relatively simple and inexpensively produced.

SUMMARY OF THE INVENTION

It is therefore a principal object of the present invention to overcome the drawbacks of the prior art.

It is a further object of the invention to provide an air bag and lid arrangement for a vehicle passenger compartment in which a time lag between inflation of the air bag and opening of an air bag lid is minimized.

In order to accomplish the aforementioned and other objects, an air bag and lid arrangement for a vehicle is provided, comprising: an air bag module including an air bag and means for inflating same, the air bag module being mounted in an opening provided in an instrument panel of the vehicle, a lid, the lid being mounted so as to be pivotally movable in an upward direction and arranged over the opening and having a hinge portion thereof adjacent to and above the air bag module.

According to a further aspect of the invention, an air bag and lid arrangement for a vehicle comprises: an opening provided in an instrument panel of the vehicle, a facing portion along an upper edge of the opening, a lid member including a flange portion along an inner side of an upper edge thereof, the flange portion corresponding to the facing portion of the opening and joined therewith via fastening means, the flange portion and the facing portion collectively forming a hinge of the lid member, and an air bag module mounted in the opening such that an upper portion of the air bag module is on a horizontal plane below a horizontal plane of the hinge, a positioning between the lid member and the mounted air bag module being established such that, in an early stage of Inflation, in an inflation mode of an air bag of the air bag module, an expanding surface portion of the air bag will exert pressure on an inner surface of the lid member at a location proximate the hinge.

DESCRIPTION OF THE PREFERRED EMBODIMENT

Figure 1:
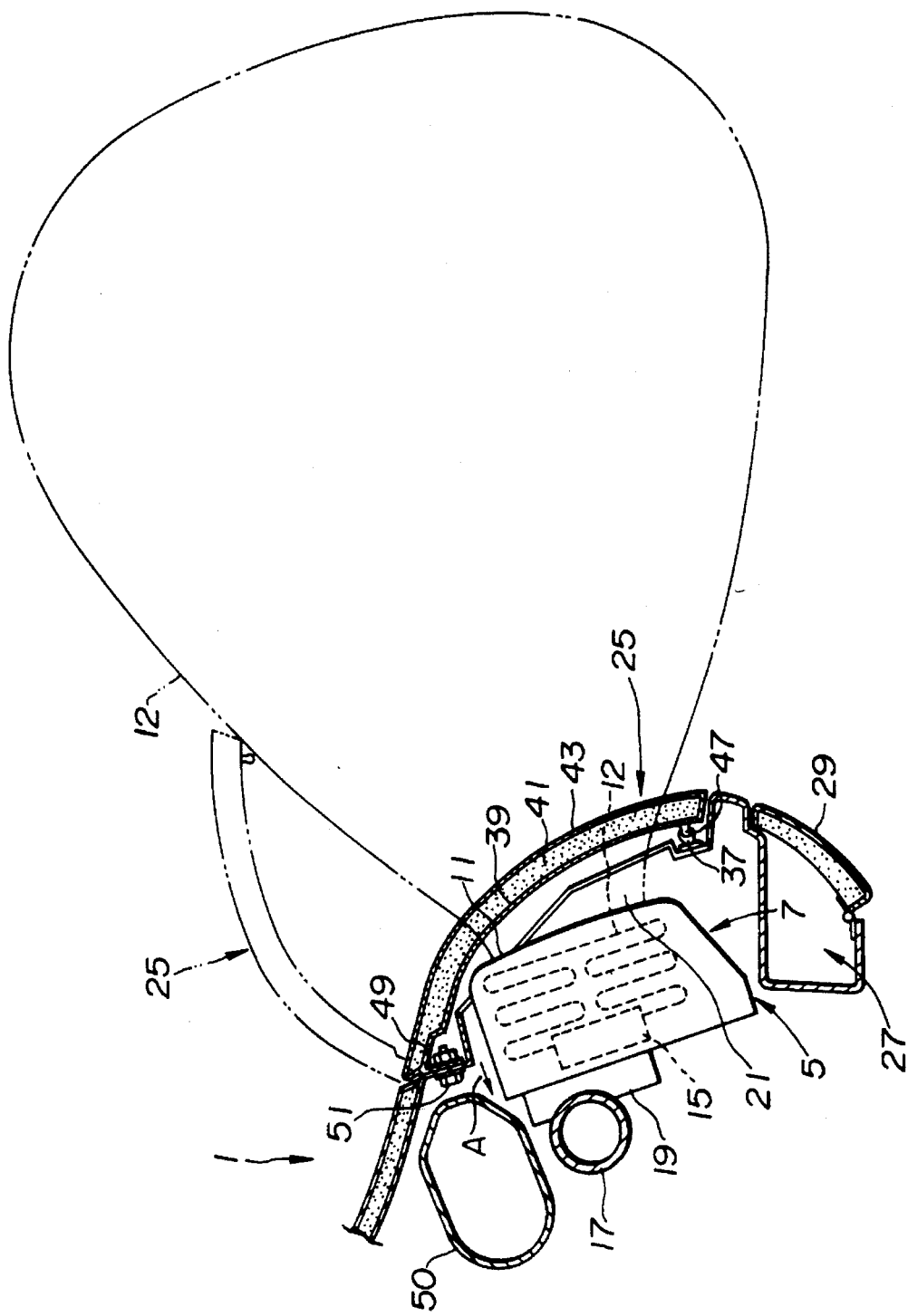
FIG. 1 Is a cross-sectional view according to one embodiment of the invention showing an air bag module installed in a vehicle instrument panel including a lid portion.
Figure 2:
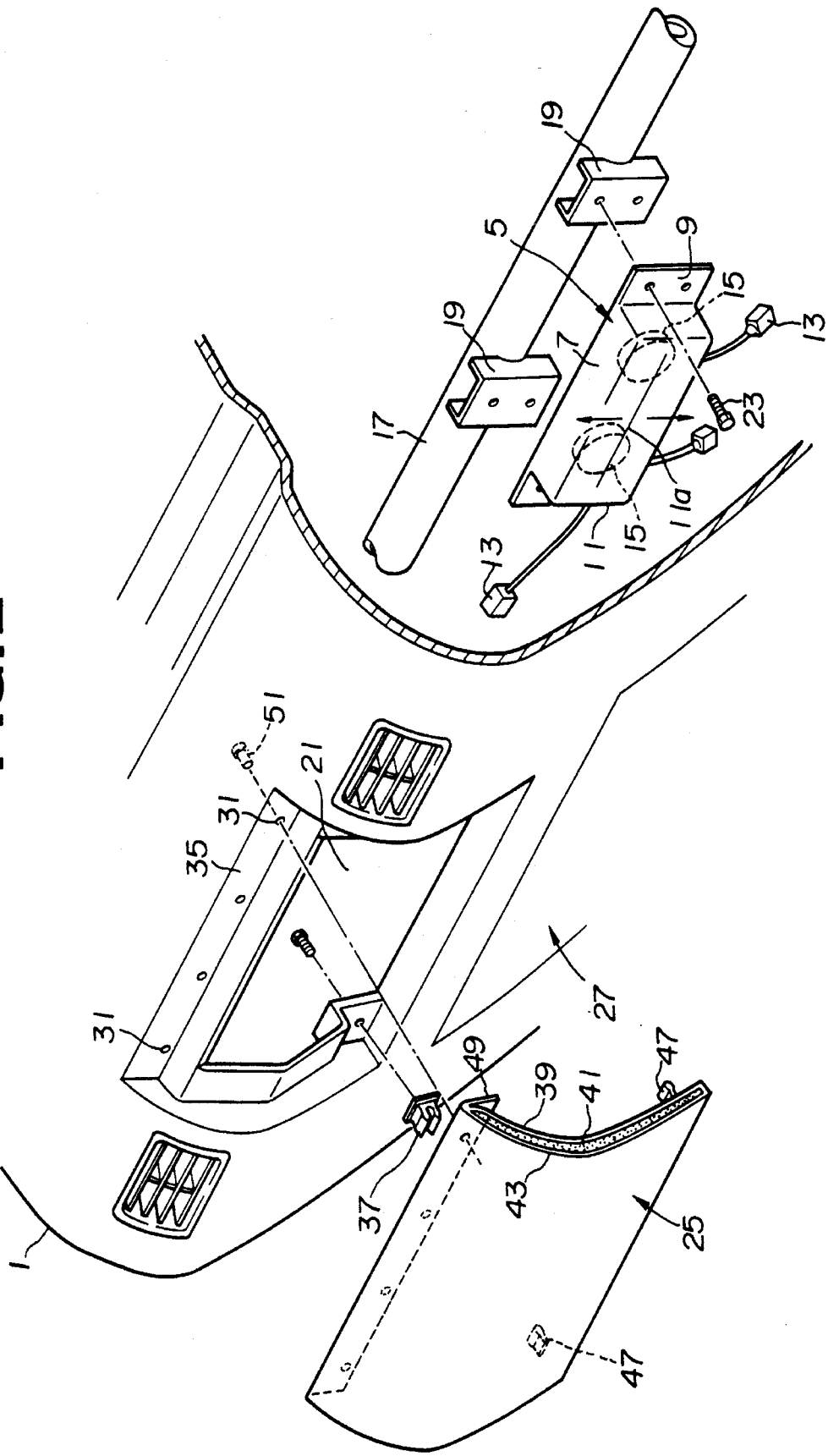
FIG. 2 is an exploded perspective view of a vehicle instrument panel including an air bag lid portion.
Figure 3:
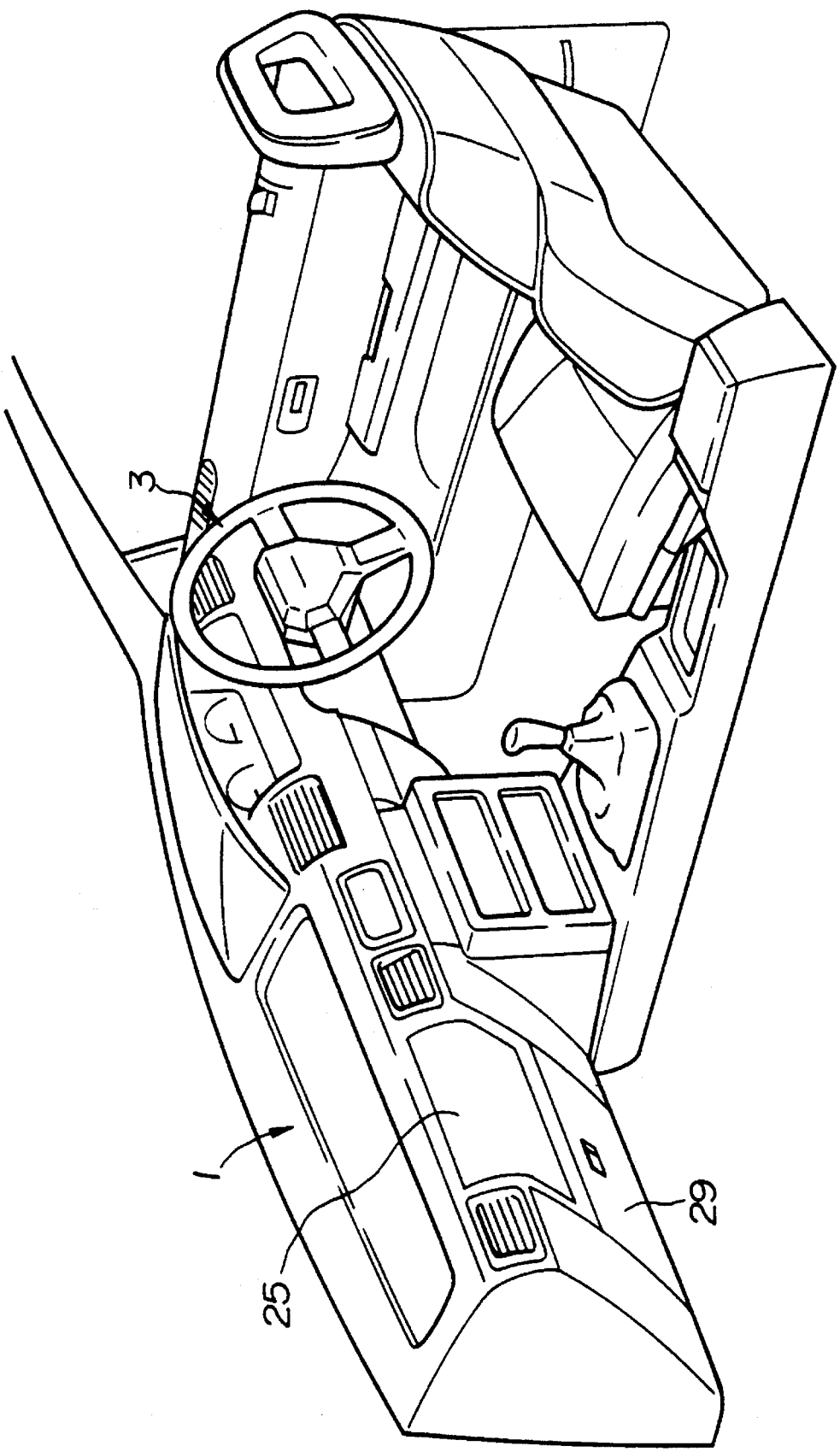
FIG. 3 is a perspective view of a vehicle passenger cabin.

Referring now to the drawings, particularly to FIG. 1, an instrument panel 1 on a passenger side of a vehicle interior is shown in cross-section. Behind the instrument panel 1 an air bag module 5 is mounted. The air bag arrangement includes a casing 7 comprising a module cover 11, base plate 9 and, referring to FIG. 2, a horizontal tear line 11a which opens the module cover 11 in upper and lower directions, causing the module casing to be moved back in the direction of the arrow A of FIG. 1, according to inflation of the air bag 12 which is positioned within the casing 7. As best seen in FIG. 2, the casing 7 is supported via the base plate 9, on brackets 19 provided on a front side of a steering member 17 mounted behind the instrument panel 1. The casing 7 may be attached to the brackets 19 via screws, or the like.

A connector 13 for a collision sensor (not shown) is provided which transmits a signal to a firing member (not shown in the drawings), to activate a gas cartridge 15, upon detection of an emergency condition requiring inflation of the air bag 12. The gas cartridge 15 is thus activated for quick inflation of the air bag 12.

As may be seen in FIG. 2, a substantially large opening 21 is provided in the instrument panel 1 located over the installed position of the air bag module 5. An openable and closable lid 25 is fitted over the opening 21. As seen in FIG. 1, at a lower portion of the instrument panel 1, below the lid 25, a glove box 27 of the vehicle is located. The glove box 27 is closed by a glove box lid 29.

Further, along an upper edge of the opening 21, installation holes 31 are formed along a facing 35. Bolts 51, may be used to fasten the lid 25 to the instrument panel 1 along the upper edge, while, at the lower side of the opening 21, clips 37 are installed, via screws for example, for interlocking with projections 47, for openably clipping the lid 25 in place.

The lid 25 may be formed of an aluminum alloy, for example, and includes an inner side 39, an outer side 43 and a resilient layer 41, formed of synthetic foam for example, included at an inner portion thereof. An upper longitudinal portion of the lid 25 includes an install flange 49 including holes corresponding to the facing 35 and the holes 31 thereof. According to this arrangement, and a selected rigidity of the material of the lid 25, the install flange 49 as joined to the facing 35 acts as a hinge upon inflation of the air bag 12. Also, according to the above-described construction, the lid 25 may be subjected to impact thereagainst (in the direction of the arrow A of FIG. 1) below a predetermined impact strength without causing inflation of the air bag 12. As seen in FIG. 1, the upper portion of the lid 25 is located above the air bag arrangement 7 such that minor impact against the lid 25 may cause the lid 25 to move in the direction of the arrow A in the drawing, but, such impact will not cause the hinge or other interior portions of the lid to Impinge on the air bag arrangement 7 and damage to the air bag arrangement 7 is prevented.

Furthermore, as seen in FIG. 1, when the air bag 12 inflates (dotted line in FIG. 1) the expanding surface of the air bag 12 applies pressure directly at the upper portion of the lid 25 to cause the lid to open substantially instantly with substantially no time lag between inflation of the air bag 12 and the opening of the lid 25.

In FIG. 1, a vent duct 50 can be seen, positioned behind and below the flange 49. The vent duct 50 may be constructed of synthetic resin for example, so as to be resiliently deformable so as not to be damaged by deformation of the hinge and/or lid 25 and so as not to affect reliable operation of the air bag module 5 or the lid 25 in any way.

In operation, when the connector 13 receives a signal indicating a sensor has detected a condition requiring inflation of the air bag 12, the gas cartridge 15 supplies gas into the air bag 12. At an early stage of the inflation of the air bag 12, the inflating surface thereof initially contacts an inner surface of the lid 25 at an area proximate the flange 49. As the pressure in the inflating air bag 12 increases, the clips 37 release the projections 47 at the lower side of the lid 25. Then, the flange 49 is retained against the facing 35 while the lid 25 bends upwardly. Thus substantially instant opening of the lid 25 is achieved and the air bag 12 may emerge from the opening 21 in the instrument panel 1 with essentially no time lag being incurred.

Thus, according to the present invention an air bag arrangement is provided with simple structure in which quick, safe opening of a lid portion, simultaneously with inflation of an air bag, is assured.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An air bag, duct and lid arrangement for a vehicle comprising:

an opening provided in an instrument panel of said vehicle;

a facing portion disposed along one edge of said opening;

a lid member disposed over said opening, and including a flange portion integrally formed along an inner side of an edge thereof corresponding to said one edge of said opening and projected so as to form an acute angle relative to said inner side of said lid member, said flange portion corresponding to said facing portion of said opening and joined therewith via fastening means, said flange portion forming a hinge of said lid member, bendable along where said flange portion projects from said inner side of said lid member;

an air bag module mounted in said opening such that said air bag module is angularly oriented in the direction of said inner side of said lid member disposed over said opening, a positioning between said lid member and said mounted air bag module being established such that, in an early stage of inflation, in an inflation mode of an air bag of said air bag module, an expanding surface portion of said air bag will exert pressure directly on said inner side of said lid member at a location proximate said edge where said flange portion projects from said inner side of said lid member; and further comprising a duct in combination with said air bag and lid member, said duct provided behind said instrument panel of said vehicle, disposed behind and proximate to a rear side of said air bag at a location substantially behind and proximate said hinge of said lid member, said duct being formed of a material resiliently deformable according to contact therewith by any portion of any one of said lid member, said facing portion and said air bag module during inflation of said air bag.

2. An air bag duct and lid arrangement as set forth in claim 1, wherein said lid member further includes projections at an inner side thereof opposite to a side on which said flange portion is provided, said opening further including clip portions at a side thereof corresponding to said inner side of said lid member for releasably engaging therewith.

3. An air bag and lid arrangement as forth in claim 1, wherein said lid member is formed of an aluminum alloy.

4. An air bag and lid arrangement as set forth in claim 1, wherein said lid member further includes a resilient layer therewithin, between an inner and outer surface thereof.

5. An air bag and lid arrangement as set forth in claim 1, wherein said opening is situated above a vehicle glove box.

6. An air bag and lid arrangement as set forth in claim 1, wherein said flange portion is movable in a direction opposite a direction of impact applied to an outer surface of said lid member.

7. An air bag and lid arrangement as set forth in claim 1, wherein said hinge comprises a single thickness of thin bendable material.

* * * * *